United States Patent Office 2,997,638
Patented Aug. 22, 1961

2,997,638
SIGNAL CONVERTER APPARATUS
Willard M. Brittain, Amherst, N.Y., assignor to Westinghouse Electric Corporation, East Pittsburgh, Pa., a corporation of Pennsylvania
Filed Apr. 16, 1957, Ser. No. 653,123
7 Claims. (Cl. 318—162)

The present invention relates, in general, to control apparatus for converting a binary control signal in digital form into an analog control signal for controlling the operation of some machine device, and more particularly the present invention relates to control apparatus for converting a binary control signal including a plurality of binary digits into an analog control signal for controlling the operation of a motor device or the like, which, in turn, operates some machine device, and further, for controlling the direction of rotation of said motor device and the operating speed of said motor device.

It is an object of the present invention to provide improved control apparatus for converting a digital binary control signal into an analog control signal for controlling the operation of a machine device by the analog control signal, which varies as a predetermined function of the arrangement of the respective values of the digits of said control signal.

It is another object of the present invention to provide an improved control apparatus for converting a digital control signal into an analog control signal for controlling the operation of a motor device, such that the rotational direction of the motor device and the operative speed of the motor device are thereby controlled.

It is a further object of the present invention to provide an improved control apparatus for converting a digital control signal into an analog control signal for controlling the operation of a motor device, and which apparatus is further operative to provide a predetermined maximum operational speed for said motor in each direction of its operation.

It is a different object of the present invention to provide an improved control apparatus for a machine device such as a reversible motor and operative with a digital control signal, which apparatus is responsive to predetermined digits of said control signal for controlling the direction of rotation of said motor as well as being responsive to predetermined digits of said control signal to determine the operative speed of said motor in either one or both of its rotational directions.

These and other objects and advantages of the present invention will become apparent in view of the following description taken in conjunction with the drawings, wherein.

Figure 1:
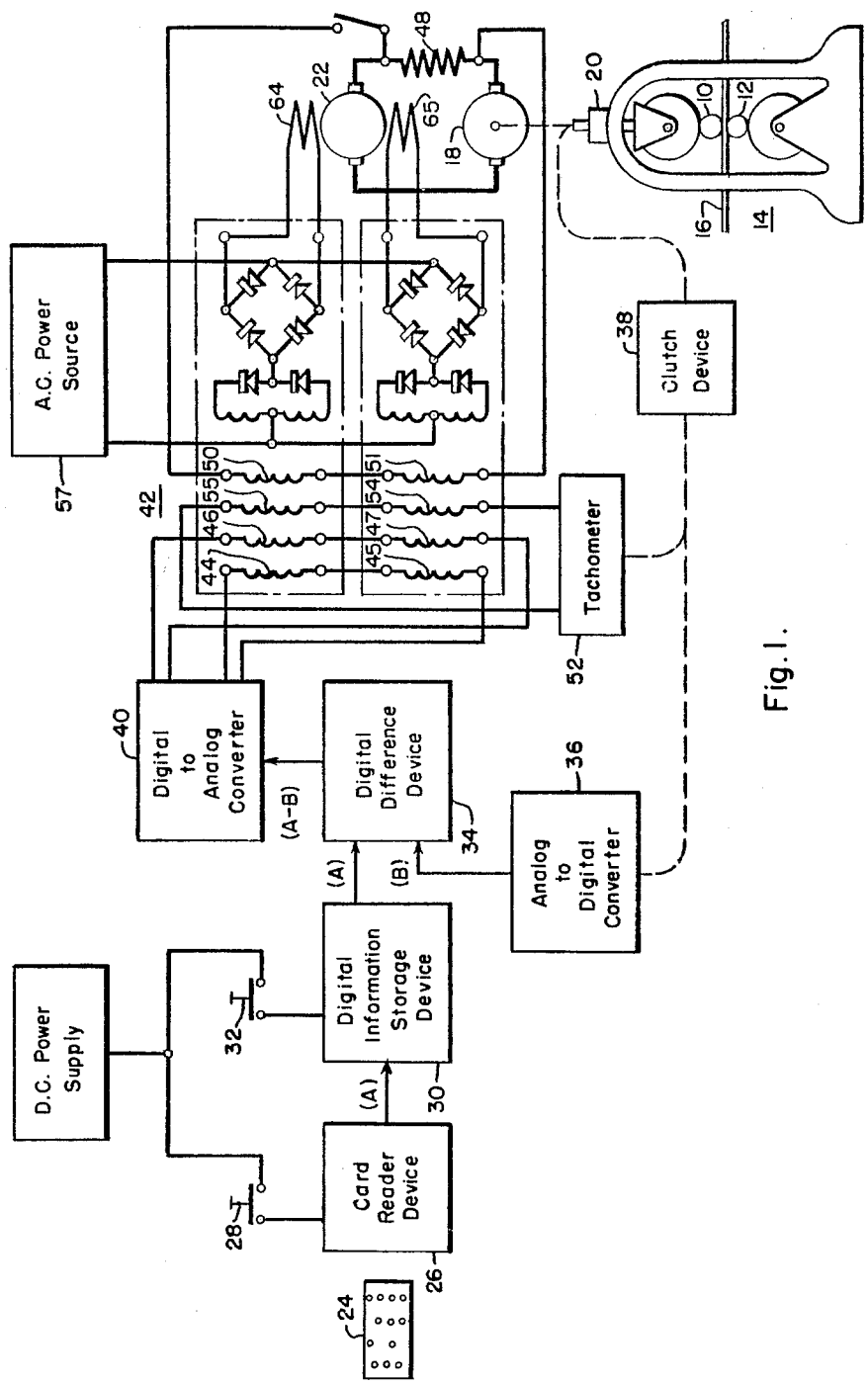
FIGURE 1 shows a diagrammatic view of a control system including the control apparatus in accordance with the teachings of the present invention.

In FIG. 1, there is shown a control system for controlling the strip thickness of a metal strip 16 passing between an upper roller member 10 and a lower roller member 12 of a rolling mill or like device 14. The strip 16 passes through the rolling mill 14 between the upper roller 10 and the lower roller 12, with the thickness of the strip 16 being varied by a screw-down control motor 18 operative through a screw-down control device 20, with said motor 18 being controlled by the energy supplied from a generator 22 connected in a supply circuit with the motor 18. Control information in the form of a predetermined desired position of the upper roller member 10 and thereby a predetermined desired thickness of the strip 16 is supplied by a punched card 24 or like information device to a card reader device 26, which is operative to provide a binary control signal (A) including a plurality of digits with each of said digits having a value respectively corresponding to the presence or absence of a punched hole in the card member 24. A control button 28 is operative when closed to cause the card reader device 26 to supply this binary control signal (A) in digital form to a digital information storage device 30, which, in turn, is controlled by a control button 32 to supply as a reference control signal (A), this binary control signal in digital form to one input of a digital difference device 34.

The second input of the digital difference device 34 receives a position feedback binary control signal (B) including a plurality of digits from an analog-to-digital converter 36 which has its input varied as an analog function of the screw-down position of the upper roller member 10 as determined by the operation of the screw-down device 20 through a clutch device 38 which operates the input of the analog-to-digital converter 36 to provide this actual position binary control signal (B) in digital form. The digital difference device 34 is operative to determine the difference between the reference control signal (A) corresponding to the predetermined desired position of the upper roller member 10 and the position feedback control signal (B) corresponding to the actual position of the upper roller member 10, and supply in its output a difference signal $(A-B)$ to the digital-to-analog converter 40. A more detailed description of the control system may be found in copending application Serial No. 653,122, filed April 16, 1957, by the same inventor and assigned to the same assignee.

The output of the digital-to-analog converter 40 is in the form of an analog control signal which varies as a function of the binary difference control signal $(A-B)$ in digital form and is operative to energize a first pair of bias or control windings 44 and 45 and a second pair of control windings 46 and 47 of the magnetic amplifier device 42 which are respectively arranged in opposition to each other.

The motor armature current responsive impedance device 48 is connected in series with the generator and motor circuit and provides a current limiting feedback signal to the control windings 50 and 51, as shown in FIG. 1. A movement speed feedback signal is supplied from the screw-down device 20 through the clutch device 38 to a tachometer 52, which, in turn, energizes the windings 54 and 55 of the well known push-pull connected magnetic amplifier circuit 42. An alternating current power supply 57 is connected through the load windings which, in turn, are connected to control the energization of the field windings 64 and 65, which, in turn, controls the output of the generator 22 and thereby controls the energization of the screw-down motor 18 regarding both the operative speed of the screw-down motor 18 and the direction of rotation of the screw-down motor 18. The push-pull magnetic amplifier circuit 42 and the generator circuit for controlling the screw-down motor 18 are well known to persons skilled in this particular art.

Figure 2:
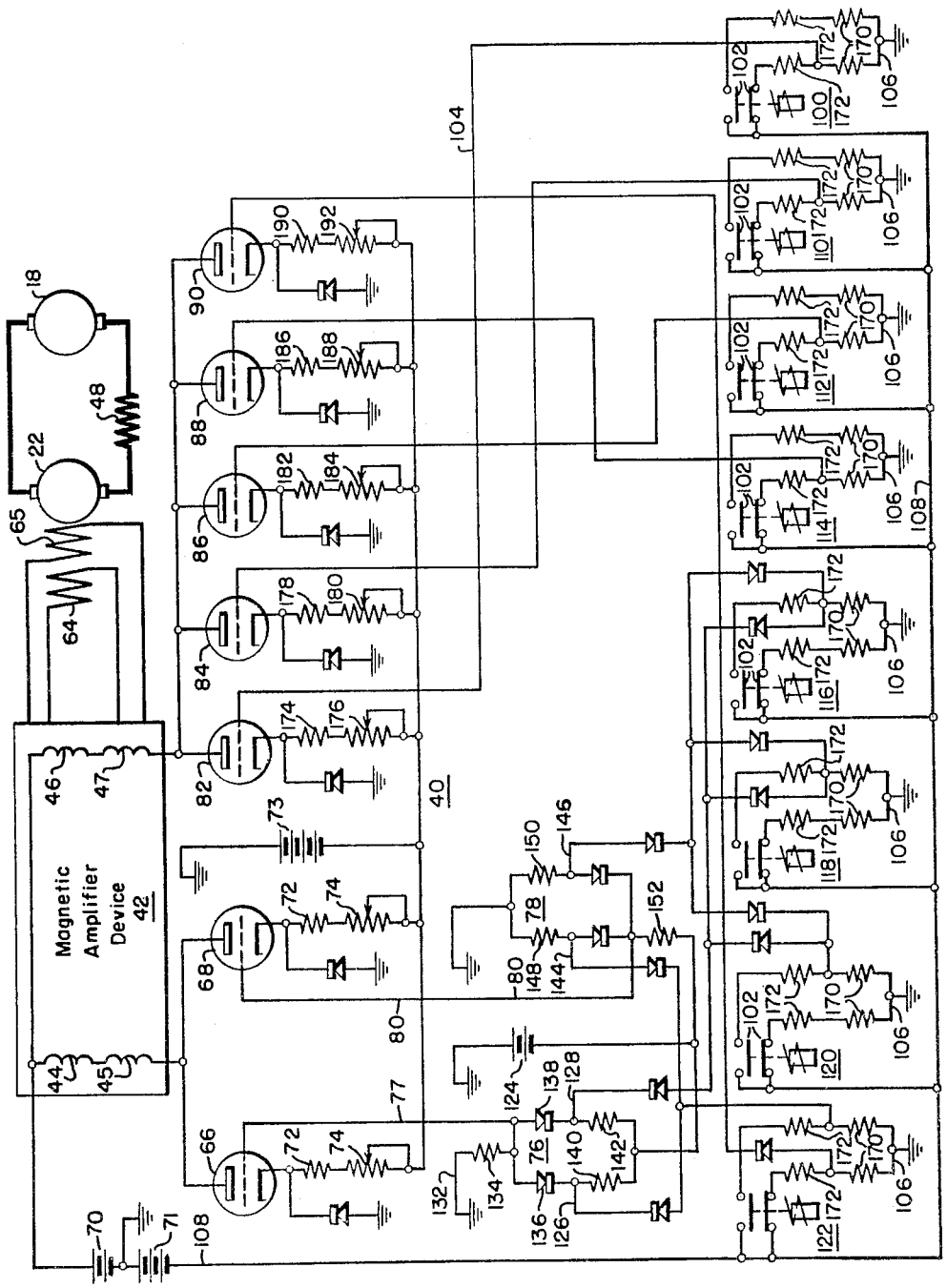
FIG. 2 shows an operational schematic view of the control apparatus in accordance with the present invention.

In FIG. 2, there is shown a schematic circuit arrangement of the digital-to-analog converter apparatus 40 connected to control the energization of the bias or control windings 44 and 45 and the control windings 46 and 47 of the magnetic amplifier device circuit 42 which, in turn, controls the polarity and the value of the energization of the field windings 64 and 65 for the generator 22 controlling the operation of the screw-down motor 18.

The bias windings 44 and 45 are connected in series with a first current control or generating device 66 and a second current control device 68 and across the terminals of a bias voltage supply 70, which may have a value in the order of 150 volts. In series with the cathode of each of the current control devices 66 and 68 is a first resistor 72 and a second resistor 74. The control electrode of the current control device 66 is energized by an AND device 76 and is normally driven to cutoff by the action of the diode AND device 76 which output is very much below ground potential. When both of the inputs of the AND device 76 are grounded, the output of the AND device 76 connected to the control electrode is at substantially ground potential and causes the current control device 66 to become conductive.

The current control device 68 is normally conductive with its control electrode being connected to the AND device 78, and the output of the AND device 78 through the conductor 80 is essentially at ground level. When both of its inputs receive a negative potential bias, corresponding to zero values for two predetermined digits of the control binary signal supplied to the digital-to-analog converter device 40 as will be later explained, the output of AND device 78 is at below ground potential and makes the current control device 68 non-conductive. The control winding 46 is energized by a plurality of current control or current providing devices 82, 84, 86, 88 and 90, with the respective current control devices 82, 84, 86 and 88 being responsive to the respective first four digits of the binary control signal ($A-B$) received from the digital difference device 34 and corresponding to the difference between the reference control signal (A) and the actual position feedback control signal (B) supplied to the difference device 34. The current control device 90 has its control electrode responsive to the carry digit of the difference binary control signal ($A-B$) supplied to the digital-to-analog converter 40.

Thusly, in the operation of the converter apparatus 40, as shown in FIG. 2, the control windings 46 and 47 are energized an amount equal to the energization of the bias windings 44 and 45, such that the respective bias and control windings effectively cancel each other out for the arbitrary zero position binary control signal ($A-B$) corresponding to the situation existing when the actual position of the upper roller member 10 corresponds to the predetermined desired position for the upper roller member 10 as indicated by the card member 24. For this zero position error condition, the current providing device 66 is non-conductive and the current providing device 68 is conductive to energize the bias windings 44 and 45 an amount equivalent to the energization of the control windings 46 and 47 by the sum of each of the current providing devices 82, 84, 86 and 88 with the carry digit responsive current providing device 90 being non-conductive.

Respecting the energization of the control windings 46 and 47 the output of each of the current generators 82, 84, 86, 88 and 90 is added together and flows into the control windings 46 and 47. When the control grid of any one of these respective current providing devices or tubes 82 through 90 is driven to some negative voltage value, sufficient to cut off the conduction of that particular tube, that tube cannot conduct. The bias resistors in the cathode circuit of each current providing device or tube are arranged such that the tubes put out different quantities of current under conduction, such as, the first current providing device 82 responsive to the first digit of the difference binary control signal ($A-B$) supplies one unit of current to the control windings 46 and 47, the second current providing device 84 supplies two units of current, the third current providing device 86 supplies four units of current, and the fourth current providing device 88 supplies eight units of current in the normal binary manner. It should be here understood that additional such current providing devices could be provided and operative in the well known binary manner, if additional digits of control signal are provided. The first current providing device or tube 82 is responsive to the value of the first digit of the difference binary control signal ($A-B$) such that the tube 82 is normally biased to cutoff until the first digit has a unit value which effectively ties the control grid of the current providing device 82 to ground potential and allows the tube to conduct to provide its one unit of current to the control windings 46 and 47. Similarly, the second current providing device 84 is normally biased to cutoff until the second digit of the difference binary control signal ($A-B$) has a unit value which effectively ties the control grid of the second current providing device 84 to ground potential and allows the tube to conduct to provide two units of current to the control windings 46 and 47. The current providing devices 86 and 88 are similarly operative. The current providing device or tube 90 is normally non-conductive unless the carry digit of the difference binary control signal ($A-B$) has a zero value, which causes the tube 90 to conduct and supply sixteen units of current to the control windings 46 and 47. Thusly, the control windings 46 and 47 are effectively energized by five current providing devices or generators all in binary array, such that the exact number used in a particular operation is predetermined to provide twice the saturation ampere turns for the control windings 46 and 47 for the magnetic amplifier 42. Thusly, the first four digits of the difference binary control signal ($A-B$) as received by the digital-to-analog converter device 40 controls the operation of the first four current providing devices 82 through 88, and the carry digit of the difference binary control signal ($A-B$) controls the operation of the fifth current providing device 90.

Figure 3:
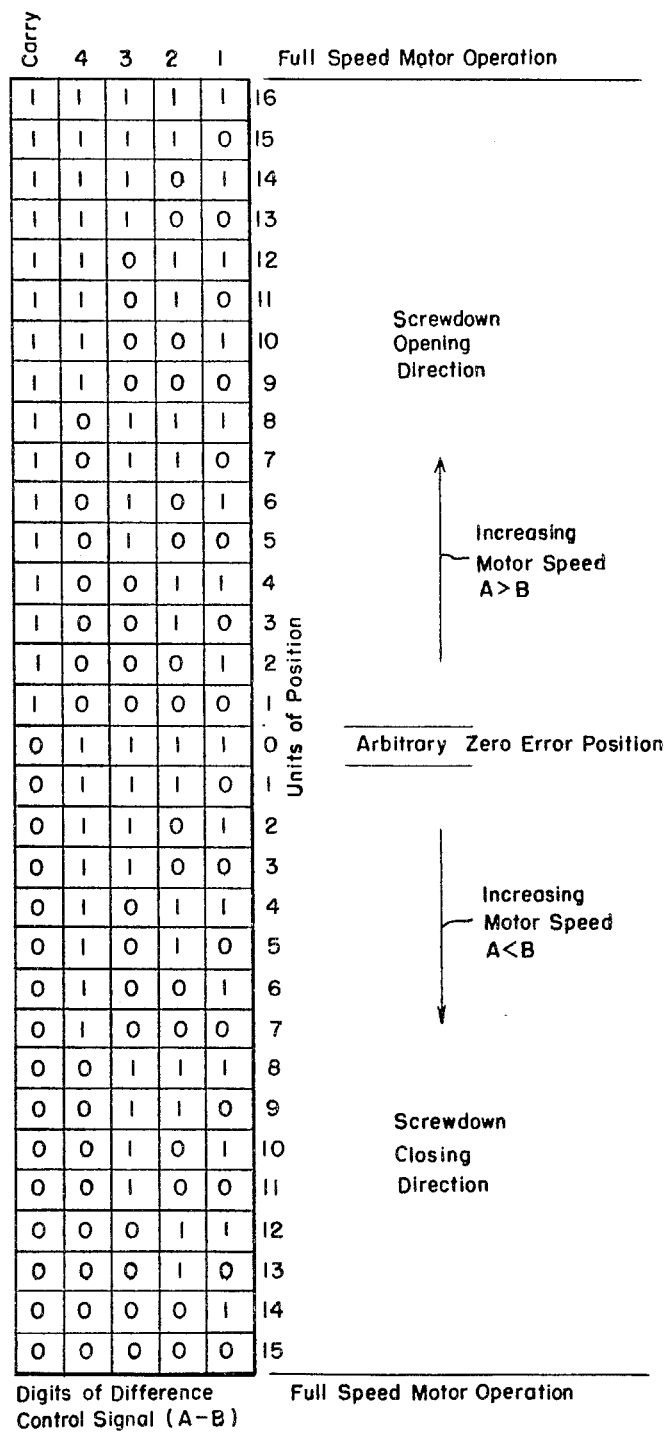
FIG. 3 is a binary control signal chart illustrating the operation of the control apparatus in accordance with the present invention.

A reference to the binary control signal chart shown in FIG. 3 shows that for the arbitrary zero error position of the upper roller member 10, which occurs when the actual position of the upper roller member 10 corresponds to the predetermined desired position for the upper roller member as indicated by the card member 24, the output binary signal ($A-B$) of the digital difference device 34 will have a unit value for the first seven digits and a zero value for the carry digit. This means that the first four current providing devices 82, 84, 86 and 88 are conducting and the fifth current providing device 90 is not conducting, such that the current supplied to the control windings 46 and 47 comprises fifteen units of current. Multiplied by the number of turns in the control windings 46 and 47 this gives the ampere-turns energization of the magnetic amplifier 42 by the control windings 46 and 47. By the various combinations of the values of the first four digits of the difference binary control number ($A-B$) and the carry digit, it is seen that the ampere-turns energization of the magnetic amplifier 42 by the control windings 46 and 47 may then vary above or below the fifteen unit value to give essentially a linear decimal ampere-turn control for the orderly progression of the binary control number ($A-B$) about the so-called arbitrary zero position error binary control number. Since the so-called arbitrary zero position error binary control member is actually supplying fifteen units of current to the control windings 46 and 47, it is necessary in order to achieve a zero or balanced ampere-turns energization of the magnetic amplifier 42 to balance or oppose the fifteen units of current supplied to the control windings 46 and 47 by an equal and opposite energization of the bias windings 44 and 45. Thusly, the bias windings 44 and 45 are so energized by the current providing device 68 which is normally conductive.

The energization circuit for the bias windings 44 and 45 includes the current providing device 66 and the current providing device 68. The control grid and therefore the conduction of each of the latter current providing devices 66 and 68 is controlled by respective diode AND networks 76 and 78 as shown in FIG. 2. The combination of the two bias current providing tubes 66 and 68 and their diode AND networks 76 and 78 are operative to give the proper ampere-turns energization to the bias windings 44 and 45 to balance and counteract the energization supplied by the control windings 46 and 47, and also, to determine the direction of rotation of the screw-down motor 18 by controlling the polarity of the energization supplied to the field windings 64 and 65 of the generator 22 and further to control the speed of rotation of the screw-down motor 18 by determining the magnitude of the energization of the field windings 64 and 65 of the generator 22. The magnetic amplifier circuit 42 is provided with a predetermined saturation point such that maximum speed of operation of the motor 18 in either direction is obtained by saturating the magnetic amplifier devices of the circuit 42 for that direction of rotation of the screw-down motor 18.

For controlling the maximum operational speed of the screw-down motor 18 in the screw-down opening direction, both bias tubes 66 and 68 are allowed to conduct. For maximum operational speed of the screw-down motor 18 in the opposite and closing direction, both bias tubes 66 and 68 are driven to cutoff.

Referring to the binary control signal chart shown in FIG. 3, it is seen that the maximum rotational speed of the screw-down motor 18 in the screw-down opening direction is desired at any time that a unit value appears in the carry digit and a unit value appears in any one of the fifth, sixth or seventh digits of the binary difference control signal $(A-B)$. Similarly, for maximum speed of the screw-down motor 18 in the screw-down closing direction, it is seen that the control signal has a zero value in the carry digit and a zero value appearing in any of the fifth, sixth or seventh digits of the difference binary control signal $(A-B)$. The bias tube 66 is normally driven to cutoff by the action of the diode AND network 76 which provides through a conductor 77 to the control grid of the bias tube 66 a below ground potential control signal when either input of the AND device 76 is energized by a signal corresponding to a zero value for the carry digit or one of the fifth, sixth and seventh digits of the difference binary control signal $(A-B)$. The other bias tube 68 is controlled by the diode AND circuit 78, which is arranged such that its output through the conductor 80 is at essentially ground potential when either of its inputs receives a control signal corresponding to a unit value for the carry digit or a unit value for one of the fifth, sixth or seventh digits of the difference binary control signal $(A-B)$. The bias tube 68 therefore serves as the bucking ampere-turns source supplied to the bias windings 44 and 45 to balance out the control ampere-turns supplied by the control windings 46 and 47 for the difference binary control signal $(A-B)$ corresponding to the zero error position of the upper roller member 10.

The first digit of the difference binary control signal $(A-B)$ is supplied to the control winding of a first relay device 100 such that when the first digit has a zero value, the control winding moves the conductor member 102 upward right and thereby energizes the conductor 104 connected to the control grid of the first current providing device 82 with a substantially ground potential signal from the grounded common conductor 106. However, when the first digit of the difference binary control signal $(A-B)$ has a unit value, the control winding for the relay device 100 is not energized to allow the conductor member 102 to move to its lower position to effectively connect the conductor 104 to the negative potential of the common conductor 108 which is connected to the negative potential terminal of the bias voltage source 70, such that the conductor 104 now receives a negative potential control signal which prevents the conduction of the first current providing device 82. The second digit of the difference binary control signal similarly energizes the control winding of a second relay device 110, such that if the second digit has a zero value, the control grid for the current providing device 84 is at substantially ground potential to allow the tube 84 to conduct and supply two units of current to the control windings 46 and 47. The relay device 112 is similarly responsive to the third digit of the difference binary control signal, and the relay 114 is similarly responsive to the fourth digit of the binary control signal. The relay device 116 is similarly responsive to the fifth digit of the difference binary control signal $(A-B)$, the relay device 118 is similarly responsive to the sixth digit of the difference binary control signal $(A-B)$, the relay device 120 is similarly responsive to the seventh digit of the difference binary control signal, and the relay device 122 is similarly responsive to the last and carry digit of the difference binary control signal.

The AND device 76 is operative with bias voltage source 124, such that if its input conductors 126 and 128 are both tied to some negative voltage at a greater negative potential than the approximately negative 25 volts of conductor 130 as determined by the bias voltage source 124, current will flow from the ground potential of conductor 132 through the 330,000 ohm resistor 134 and each of the diodes 136 and 138 and the 33,000 ohm resistors 140 and 142 to the conductor 130, such that the voltage divider effect of the larger resistor 134 in combination with each of the smaller resistors 140 and 142 makes the voltage of conductor 77 substantially the same negative potential value of the conductor 130 since the value of the resistor 134 is substantially ten or more times greater than the value of the like resistors 140 and 142. If the input 126 is connected to substantially ground potential by the carry digit having a unit value such that the relay device 122 moves its conductor member to its downward position, then, current will flow from the input conductor 126 through the resistor 140 to the conductor 130. However, because of the diode 136, this current cannot flow through the diode 138 and resistor 142 to the conductor 130. However, current from the conductor 132 may still flow through the resistor 134 and the resistor 142 to the conductor 130 to provide the previously described voltage divider action of the resistors 134 and 142 to still be effective to hold the conductor 77 at substantially the same negative potential as the conductor 130 and still prevent the conduction of the bias tube 66. However, if both inputs 126 and 128 are provided with a substantially ground potential signal resulting from the carry digit having a unit value and either one of the fifth, sixth or seventh digits having a unit value, then there is no current flow in the resistor 134 and therefore the conductor 77 is at substantially ground potential to cause the bias tube 66 to be conductive and thereby provide a current flow to energize the bias windings 44 and 45.

When the bias tube 66 is conductive, the screw-down motor 18 is operative in the screw-down opening direction. When the bias tube 66 is non-conductive, the screw-down motor 18 is operative in the screw-down closing direction.

The AND device 78 controls the energization of the bias tube 68, such that the output conductor 80 is normally at substantially ground potential and thereby allows the bias tube 68 to be conductive, unless both of the input conductors 144 and 146 of the bias device 78 are provided with negative potential control signals corresponding to the carry digit having a zero value and thereby causing the relay device 122 to move its conductor member to its upper position and one of the fifth, sixth or seventh digits of the difference binary control signal $(A-B)$ having a zero value to cause one of the respective relay devices 116, 118 and 120 to move its respective conductor member up and thereby remove the input 146 from ground potential. In this regard, it should be noted that the resistor members 148 and 150 are each similar and have a value of approximately 33,000 ohms which is one-tenth the impedance value of the resistor member 152 having a value of 330,000 ohms such that the output conductor 80 is normally at substantially ground potential until both of the input conductors 144 and 146 are supplied with control signals at substantially below ground potentials, to thereby provide the conductor 80 with a control signal at substantially below ground potential. This latter control signal is operative to terminate the conduction of the bias tube 68.

The following impedance values of the various impedance members may be helpful in understanding the operation of one particular modification of the present invention:

| | Ohms |
|---|---|
| Resistors 72 | 1,000 |
| Resistors 74 | 1,600 |
| Resistors 134 and 152 | 330,000 |
| Resistors 140, 142, 148 and 150 | 33,000 |
| Resistors 170 | 3,300 |
| Resistors 172 | 33,000 |
| Resistor 174 | 200,000 |
| Resistor 176 | 200,000 |
| Resistor 178 | 100,000 |
| Resistor 180 | 100,000 |
| Resistor 182 | 50,000 |
| Resistor 184 | 50,000 |
| Resistor 186 | 25,000 |
| Resistor 188 | 25,000 |
| Resistor 190 | 12,500 |
| Resistor 192 | 12,500 |

The voltage supply 70 may have a value in the order of 150 volts, the voltage supply 71 may have a value in the order of 250 volts, and the voltage supply 73 may have a value in the order of 250 volts.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. Control apparatus for converting a digital control signal to an analog control signal, said apparatus being operative with first and second load devices and being operative with a binary signal having a plurality of digits, including a first current providing device operatively connected to said first load device and responsive to at least two digits of said binary signal for controlling the operation of said first current providing device to provide a predetermined analog current flow to said load device when each of said two digits of said binary signal has respectively a predetermined value, a second current providing device operatively connected to said first load device and responsive to at least two digits of said binary signal for controlling the operation of said second current providing device to provide a predetermined analog current flow to said load device when each of the latter two digits of said binary signal has respectively a predetermined value, and a third current providing device operatively connected to said second load device and responsive to at least one digit of said binary signal for controlling the operation of said third current providing device to provide a predetermined analog current flow to said second load device which varies as a predetermined function of the at least one digit of said binary signal to which said third current providing device is responsive.

2. Control apparatus for converting a digital signal into an analog signal for energizing a load device, said control apparatus being operative with a binary signal having a plurality of digits, including a first current providing device operatively connected to said load device and responsive to at least two digits of said binary signal for controlling the operation of said first current providing device to provide a predetermined analog current flow to said load device when each of said two digits of said binary signal has respectively a predetermined value, and a second current providing device operatively connected to said load device and responsive to at least two digits of said binary signal for controlling the operation of said second current providing device in providing a predetermined analog current flow to said load device when each of the latter two digits of said binary signal has respectively a predetermined value.

3. Control apparatus for converting a digital control signal into an analog control signal for energizing a load device, said control apparatus being operative with a binary signal having a plurality of digits including a carry digit, including a first current providing device operatively connected to energize said load device and responsive to said carry digit and one other of said digits of said binary signal for controlling the operation of said first current providing device in providing an analog current flow to said load device when said carry digit and said other digit of said binary signal has respectively a predetermined value, and a second current providing device operatively connected to energize said load device and responsive to at least said carry digit and one other digit of said binary signal for controlling the operation of said second current providing device in providing an analog current flow to said load device when each of said carry digit and the latter said one other digit of said binary signal has respectively a predetermined value.

4. Control apparatus for converting a digital signal into an analog signal for energizing a first load device and a second load device, said control apparatus being operative with a binary signal having a plurality of digits including a carry digit, including a first current providing device operatively connected to energize said first load device and responsive to at least said carry digit and one other of said digits of the binary signal for controlling the operation of said first current providing device to provide an analog current flow to energize said first load device when each of said carry digit and said one other digit of said binary signal has respectively a predetermined value, a second current providing device operatively connected to energize said first load device and responsive to at least said carry digit and one other digit of said binary signal for controlling the operation of said second current providing device in providing an analog current flow to energize said first load device when each of said carry digit and the latter said one other digit of said binary signal has respectively a predetermined value, and a third current providing device operatively connected to said second load device and responsive to at least one digit of said binary signal other than said carry digit for controlling the operation of said third current providing device in providing an analog current flow to energize second load device when the latter said one digit of said binary signal has a predetermined value.

5. Control apparatus for converting a digital control signal into an analog control signal and being operative with first and second load devices, said control apparatus being operative with a binary signal having a plurality of digits, including a first current providing device operatively connected to said first load device, said first current providing device including a first AND device having a pair of inputs responsive respectively to at least two digits of said binary signal for controlling the operation of said first AND device and thereby for controlling the operation of said first current providing device to provide a predetermined analog current flow to said first load device when each of said two digits of said binary signal has respectively a predetermined value, a second current providing device operatively connected to said first load device and including a second AND device having a pair of inputs responsive respectively to at least two digits of said binary signal for controlling the operation of said second AND device and thereby said second current providing device to provide a predetermined analog current flow to said first load device when either one of the latter two digits of said binary signal has a predetermined value, and a third current providing device operatively connected to said second load device and responsive to at least one digit of said binary signal for controlling the operation of said third current providing device to provide a predetermined analog current flow to said second load device which varies as a predetermined function of the number of digits of said binary signal to which said third current providing device is responsive.

6. Control apparatus for converting a digital control signal into an analog control signal for energizing a load device, said control apparatus being operative with a binary signal having a plurality of digits including a carry digit, including a first current providing device operatively connected to energize said load device and including a first AND device having a pair of inputs responsive respectively to said carry digit and one other of said digits of said binary signal for controlling the operation of said first current providing device in providing an analog current flow to said load device when each of said carry digit and said other digit of said binary signal has respectively a predetermined value, and a second current providing device operatively connected to energize said load device and including a second AND device having a pair of inputs respectively responsive to at least said carry digit and one other digit of said binary signal for controlling the operation of said second current providing device in providing an analog current flow to said load device when at least one of said carry digit and the latter said other digit of said binary signal has respectively a predetermined value.

7. In digital control apparatus for controlling the operation of a reversible motor device in a first direction and a second direction, said control apparatus being operative with a control binary signal having a plurality of digits, the combination of a first current providing device operatively connected to control the operation of said motor device and including a first AND device having an input responsive to a predetermined digit of said binary signal such that if said predetermined digit has a first value the first current providing device is operative to provide an analog current to energize said motor device and thereby to control the operation of said motor device in one of said directions and if said predetermined digit has a second value the first current providing device is not operative to provide an analog current flow and thereby controls the operation of said motor device in the other of said directions, and a second current providing device operatively connected to control the operation of said motor device and including a second AND device having an input responsive to a predetermined digit of said binary signal such that if the latter said predetermined digit has a first value the second current providing device is operative to provide an analog current and thereby control the operation of said motor device in one of said directions and if the latter said predetermined digit has a second value the second current providing device is not operative to provide an analog current flow and thereby controls the operation of said motor device in the other of said directions.

References Cited in the file of this patent

UNITED STATES PATENTS

| | | |
|---|---|---|
| 2,519,339 | Avery | Aug. 22, 1950 |
| 2,600,308 | Lund et al. | June 10, 1952 |
| 2,817,775 | Rosenberg et al. | Dec. 24, 1957 |